H. VANDERPLOEG.
WIRE SPRING.
APPLICATION FILED APR. 23, 1917.
1,291,287.
Patented Jan. 14, 1919.
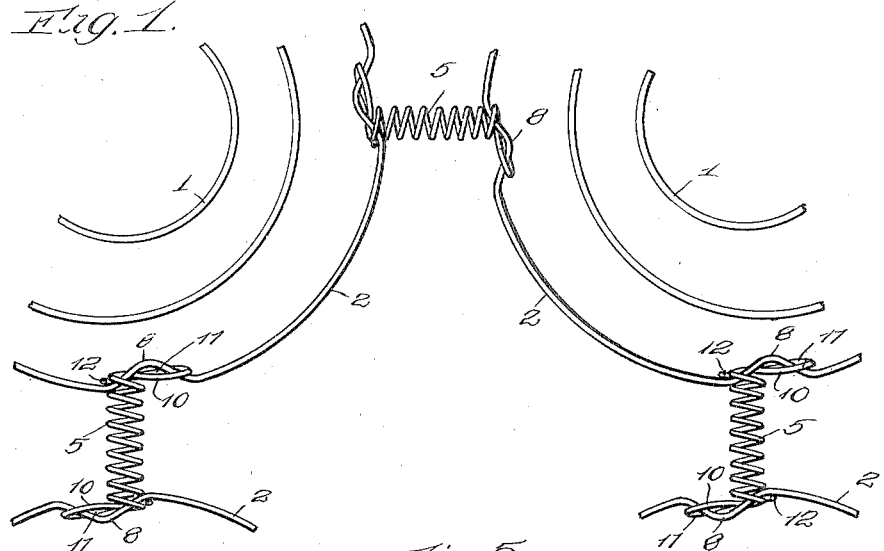
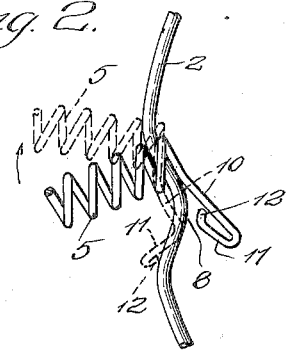
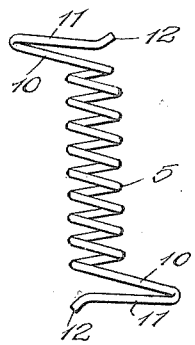
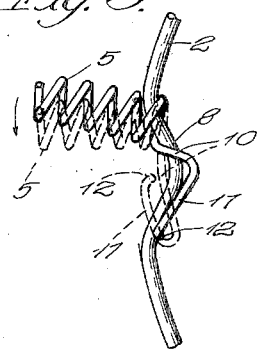
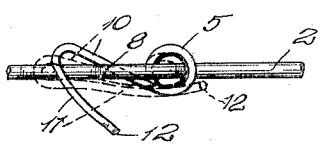
Inventor,
Henry Vanderploeg.
Witness:

UNITED STATES PATENT OFFICE.

HENRY VANDERPLOEG, OF CHICAGO, ILLINOIS.

WIRE SPRING.

1,291,287.  Specification of Letters Patent.  Patented Jan. 14, 1919.

Application filed April 23, 1917. Serial No. 164,030.

*To all whom it may concern:*

Be it known that I, HENRY VANDERPLOEG, a citizen of the United States, residing in the city of Chicago, in the county of Cook and State of Illinois, have invented new and useful Improvements in Wire Springs, of which the following is a specification.

This invention relates to improvements in wire springs and more especially to the type of spring commonly used in upholstery and in beds.

One of the objects of the invention is to provide a yielding support for a mattress, if the spring is used in a bed, or for the covering of a chair, couch or other article of furniture, through the employment of wire springs designed and arranged in such manner that they will permit of a maximum amount of flexibility without being permanently distorted; and at the same time provide a construction which is designed to permit of great economy in the manufacturing and assembling of the component parts.

The invention therefore contemplates a number of large spiral load-supporting springs arranged side by side with their axes parallel, or substantially parallel, each spring being connected to adjacent springs by small radially extending helical springs, which latter are joined to points in the circumferences of the top rings or convolutions of the large spiral springs.

An improved bed or upholstery spring embodying the principles of the invention is illustrated in the accompanying drawings in which:

Figure 1 is a top plan view showing portions of some of the large spiral load-supporting springs with the smaller, radial connecting springs joined to them.

Fig. 2 is a view showing a portion of the circumference of the top ring of one of the large load-supporting spiral springs, illustrating one of the steps in the operation of connecting one of the radial springs to it.

Fig. 3 is a similar view showing a further step in the operation of connecting the springs together.

Fig. 4 is a view showing the same parts, as seen in a section on a chord of the large ring.

Fig. 5 is a view in perspective showing one of the small helical springs detached from the rest of the structure.

As shown in said drawings, the improved bed or upholstery spring comprises a number of large spiral springs, 1, made of stiff spring wire, arranged side by side with their axes parallel or substantially parallel and the top rings or convolutions 2 of each spring substantially in the same horizontal plane, if a flat supporting surface is desired; or of such relative heights as to form the shape desired for supporting a mattress, pad, mat, stuffing, or the like. Each large spring, except those in the corners and edges of the bed or other piece of furniture, is joined on four sides to the adjacent springs by means of small helical springs 5; and for the purpose of providing a rigid and permanent connection between the ends of the helices and points in the circumferences of the large springs, which will not work loose or rub and cause squeaking, and which is adapted for simplicity and economy in assembling the parts, the two sets of springs are shaped as follows: In the upper and outer ring or convolution 2 of each large spiral load-supporting spring there is formed at each place where a helical radial spring is to be joined, a reëntrant bend or kink 8, and each of the small springs 5 is formed at each end of its helix with an end of wire 10, projecting tangentially from the last convolution, thence bent back to form a length 11 making a small acute angle with the part 10, and having its free end 12 bent away from the plane which is normal to the adjacent end of the axis of the helix.

With the parts thus formed, the assembling of the springs together and the connecting of the small helical springs 5 to the large spiral springs 1 is a comparatively simple operation and permits of great speed and economy in its carrying on, this operation being performed as follows: One of the small helical springs and one of the large spiral springs are brought together, as indicated in the full lines in Fig. 2, and the last turn or winding at one end of the helix is hooked over the wire in the circumference 2 of the large spring at the point where the latter bends inward to form a reentrant kink 8. Next, the free end of the helix is moved in a circumferential direction, as indicated by the curved arrow, to bring the helix into the position shown in dotted lines, with the projecting parts 10 and 11 outside of the circumference of the ring 2. The helix is then rotated about its own axis so as to bring the projecting ends 10 and 11 up above the plane of the ring 2 and into the position shown in full lines in Fig. 3; and the helix is then rotated in the opposite direction about its axis so as to hook the projecting end 11 down inside the circumference of the ring 2 and on the opposite side of the wire from the end 10, as indicated by the dotted lines in Fig. 3 and as shown by the full lines in Fig. 4. This completes the operation of assembling and it is necessary then only to pinch the ends of the helix together with a pair of pliers or the blow of a hammer to fit the helix tightly upon the large ring as indicated by the dotted lines in Fig. 4 and as shown in the view of the complete springs in Fig. 1, this operation of pinching the ends together likewise flattening the end coil of the helix, as also shown in the dotted lines of Fig. 4, so as to make a strong, rigid and permanent connection between the parts, and bringing the free end 12 up close to the end turn of the helix where it is not liable to injure the material which may rest upon the springs. In the same manner the other springs are connected together, thus forming a yielding structure adapted to support a mattress or stuffing for upholstery, admitting of a maximum amount of flexibility, and with the large load-supporting springs 1 permanently kept in their proper relation to each other to perform the functions required.

I claim as my invention:

1. The combination of a spirally wound wire spring having a reëntrant bend in its circumference and a helical spring adapted for joining to the spiral spring at the reëntrant bend to extend radially therefrom, the helical spring having an end projecting tangentially, thence bent back to form a small acute angle with the tangential part, whereby the helix is adapted for joining to the spiral by hooking an end convolution of the helix over the wire of the spiral adjacent to the reëntrant bend and rotating the helix to hook the tangential extension around the wire of the spiral.

2. The combination of a spirally wound wire spring having a reëntrant bend in its circumference and a helical spring adapted for joining to the spiral spring at the reëntrant bend to extend radially therefrom, the helical spring having an end projecting tangentially, thence bent back to form a small acute angle with the tangential part, and its free end bent away from the end of the helix, whereby the helix is adapted for joining to the spiral by hooking an end convolution of the helix over the wire of the spiral adjacent to the reëntrant bend and rotating the helix to hook the tangential extension around the wire of the spiral.

In witness whereof, I have hereunto subscribed my name this 17th day of April, 1917.

HENRY VANDERPLOEG.